Oct. 30, 1956 C. H. HACKER 2,769,011
CHLOROPHYLLIN DERIVATIVE AND ITS PRODUCTION
Filed April 26, 1951
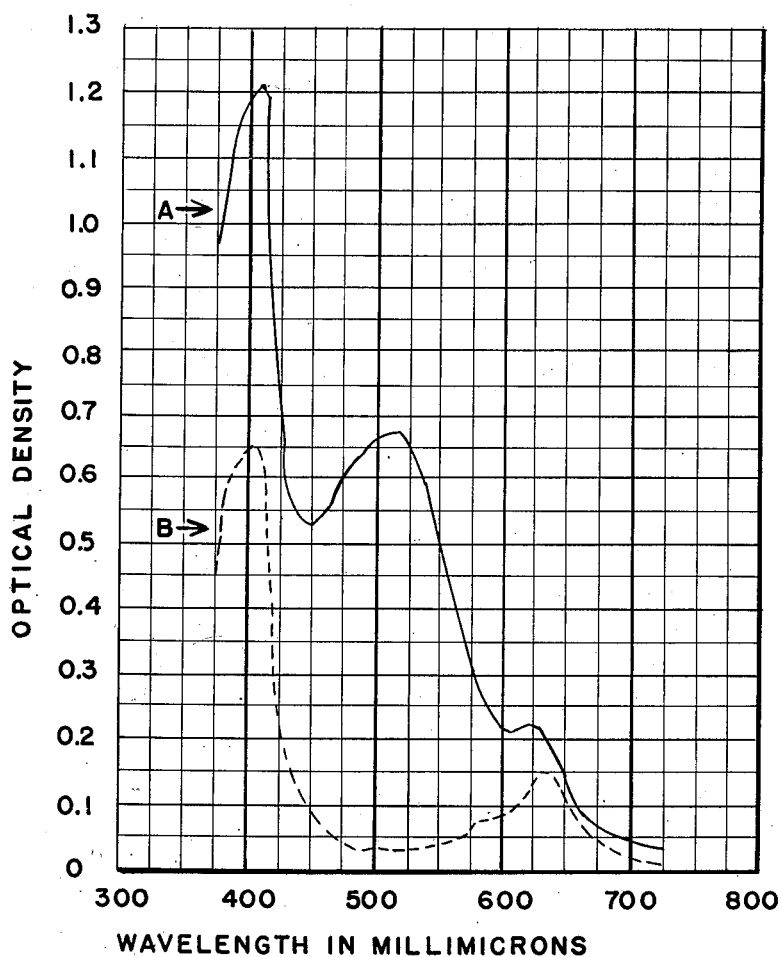
FIG. I.
CHARLES H. HACKER
*INVENTOR.*

2,769,011
CHLOROPHYLLIN DERIVATIVE AND ITS PRODUCTION

Charles H. Hacker, Brooklyn, N. Y.

Application April 26, 1951, Serial No. 223,115

16 Claims. (Cl. 260—314)

This invention relates to a process for preparing a pink or flesh colored derivative of chlorophyll from green colored water soluble chlorophyll or chlorophyllin salts and to the product thus obtained.

The green pigments extracted or derived from the chloroplasts or protoplasmic body of green plants is generally referred to as chlorophyll. Commercially, chlorophyll has been defined as the green coloring matter extracted from plants. These pigments have been separated chemically and the most important of them are designated chlorophyll $a$ and chlorophyll $b$. The following formulas for these substances are indicated by the present state of the art:

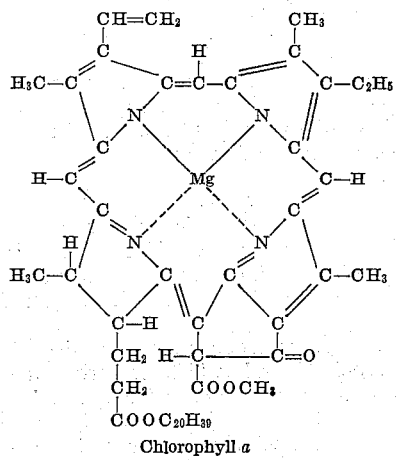

Chlorophyll $a$

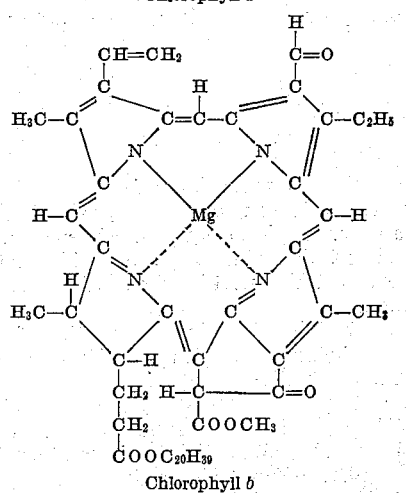

Chlorophyll $b$

It will be seen that the principal difference between these two types of chlorophyll is the presence of the methyl or aldehyde group. In commercial practice the two types of chlorophyll are generally not separated from each other but appear in the same ratio as they exist in the plants from which they are extracted. The ratio in which these substances usually occur in plant life is 2.5 parts of chlorophyll $a$ to 1 part of chlorophyll $b$ although considerable variance from this ratio has been found to occur in specific plants.

The magnesium atom at the center of the molecule can be replaced by other metals such as copper and iron this giving rise to copper, iron and magnesium chlorophyllins from which alkaline metal salts may be derived. It is preferred to use the water soluble sodium and potassium salts of copper or magnesium chlorophyllin $a$ and $b$ in connection with the practice of the present invention.

The chlorophylls and their derivatives, particularly the water solubles chlorophyllins and their alkaline metal salts have found widespread application as therapeutic agents. Recent investigations disclose these substances to have a cell stimulating action in the formation of granular tissue and a marked accelerating effect in the healing of a large variety of traumatic and thermal wounds. The substances have been shown to inhibit the activity of various types of bacteria and have been found to have widespread application in the treatment and deodorization of various secondarily infected malodorous wounds. They have been incoporated in ointments and solutions for use in the treatment of wounds, burns, ulcers, skin diseases and the deodorization of malodorous lesions. Additionally they have been advantageously incorporated in chewing gums and tooth pastes for oral hygiene purposes. A serious deterrent to the more widespread use of these chlorophyllins and their salt derivatives in hand lotions, mouth washes, tooth pastes and similar combinations has been the characteristic dark green color which they impart to any preparation in connection with which they are used. The presence of impurities also serves to retard their therapeutic action.

Although it has been felt that considerable advantage could be realized from the incorporation of chlorophyll derivatives in hand lotions and creams, the unaesthetic appearance of the green coloring imparted thereto thereby and its staining effect have restricted its use in these applications considerably. Similar objections exist to the use of these substances in connection with oral applications such as mouth washes and tooth pastes. When applied in the form of a salve or ointment to an exposed portion of the skin such as the hands or face, it appears as a green blotch which has an undesirable and unpleasant appearance. Many persons have therefore been reluctant or have avoided the topical use of these salves or ointments in view of the pronounced green color which must be applied to the skin for a number of days.

It is therefore an object of this invention to provide a process for preparing chlorophyll derivatives suitable for use in the above applications from which the objectionable green color has been eliminated.

An additional object of this invention is to provide a derivative of chlorophyll and chlorophyllin salts which may be readily and advantageously utilized in the above applications and which is of a pleasing pink or flesh color.

Another object of this invention is to provide a method whereby considerable waxy impurities of commercial chlorophyllins may be eliminated therefrom as well as the objectionable green color, and thus produce a highly desirable pink or flesh colored derivative of chlorophyll and chlorophyllin salts having improved therepeutic value.

In order to accomplish these and other objects a solution of an alkaline metal chlorophyllin salt such as the sodium or potassium salt of magnesium or copper chlorophyll $a$ and $b$ is subjected to the action of sodium bisulphite thereby separating impurities therefrom and producing a pink or flesh colored solution of the chlorophyllin derivative which may be reduced to solid form and combined with suitable vehicles for use.

Thus for example a commercially available mixture of potassium copper chlorophyll *a* and *b* which is in the form of dark green colored crystals is dissolved in water to form a 2% solution. To 100 cc. of this solution is added 35 grams of sodium bisulphite and thoroughly mixed therewith. The mixture is allowed to stand for several days at room temperature to allow for the completion of the reaction. The reaction may be accelerated by the application of heat.

Upon filtration the filtrate obtained is a pink or flesh colored solution of the chlorophyllin derivative which may be reduced to crystalline form by a suitable drying method as for example by air or spray drying. There is thus obtained a chlorophyllin derivative adsorbed on the sodium bisulphite which may be directly incorporated in solutions, salves or ointments without separation therefrom if desired. In so doing advantage may thus be taken of the medicinal value of the sodium bisulphite to enhance the effectiveness of the resulting therapeutic agent. If a further purified form of the chlorophyllin derivative is desired such further separation from the sodium bisulphite may be accomplished by standard chromatographic or electrophoretic methods. The precipitate or residue resulting from the practice of the above method is a waxy, green solid substance which contains a substantial quantity of the impurities of the commercial chlorophyllin the removal of which enhances the general therapeutic value of the end product.

The improved chlorophyllin derivative may also be obtained by the use of sodium copper chlorophyllin. Thus a commercially available mixture of sodium copper chlorophyll *a* and *b* which is in the form of dark green colored crystals is dissolved in water to form a 2% solution. To 100 cc. of this solution is added 35 grams of sodium bisulphite and thoroughly mixed therewith. The mixture is allowed to stand for several days at room temperature to allow for the completion of the reaction. The reaction may be accelerated by the application of heat. Upon filtration the filtrate obtained is a pink or flesh colored solution of the chlorophyllin derivative which may be reduced to crystalline form by a suitable drying method as for example by air or spray drying.

Similarly a commercially available mixture of potassium magnesium chlorophyll *a* and *b* which is in the form of dark green colored crystals is dissolved in water to form a 2% solution. To 100 cc. of this solution is added 35 grams of sodium bisulphite and thoroughly mixed therewith. The mixture is allowed to stand for several days at room temperature to allow for the completion of the reaction. The reaction may be accelerated by the application of heat. Upon filtration the filtrate is acidified with a suitable acid such as hydrochloric. It has been found advantageous to carry on the acidification to a pH of approximately 2. A pink or flesh colored solution of the chlorophyllin derivative is thus obtained which may be reduced to crystalline form by a suitable drying method as for example by air or spray drying.

The method has also been practiced with sodium magnesium chlorophyllin. Thus a commercially available mixture of sodium magnesium chlorophyll *a* and *b* which is in the form of dark green colored crystals is dissolved in water to form a 2% solution. To 100 cc. of this solution is added 35 grams of sodium bisulphite and thoroughly mixed therewith. The mixture is allowed to stand for several days at room temperature to allow for the completion of the reaction. The reaction may be accelerated by the application of heat. Upon filtration the filtrate is acidified with a suitable acid such as hydrochloric acid. It has been found advantageous to carry on the acidification to a pH of approximately 2. A pink or flesh colored solution of the chlorophyllin derivative is thus obtained which may be reduced to crystalline form by a suitable drying method as for example by air or spray drying.

The chlorophyllin derivative prepared in accordance with the foregoing examples exhibits a high degree of purity as a result of the removal of impurities therefrom and is of an improved therapeutic value and effectiveness.

Curve A of Figure 1 illustrates the degree of spectral optical absorption of a water solution of the chlorophyllin derivative prepared by means of the foregoing process. As will be seen from that curve, pronounced absorption occurs in the wavelengths shorter than 424 and 575 millimicrons comprising the blue and green regions of the visible spectrum. The optical absorption is considerably lower and pronouncedly minimal in all wavelengths longer than these and comprising the yellow, orange and red regions of the spectrum. The optical characteristics of the chlorophyllin derivative comprising the present invention may be more fully appreciated by comparison of the foregoing curve with the curve shown in broken lines and designated by the letter B. Curve B represents a typical absorption curve of a water solution of a commercially available sodium copper chlorophyllin *a* and *b*.

As will be seen from curve B the absorption of the commercial chlorophyllin salt is pronouncedly minimal in the blue and green regions whereas the absorption of the chlorophyllin derivative comprising the present invention in the blue and green regions is pronouncedly maximal.

I have here shown and described preferred embodiments of my invention. It will be apparent, however, that this invention is not limited to these embodiments and that many changes, additions and modifications can be made in connection therewith without departing from the spirit and scope of the invention as herein disclosed and hereinafter claimed.

Having described my invention, what I claim as new and desire to secure by Letters Patent is:

1. The method of producing a derivative of an alkali metal chlorophyllin salt which comprises the steps of forming a solution of said chlorophyllin salt, reacting said solution with sodium bisulphite and filtering said solution to remove the solid material resulting from said reaction therefrom.

2. The method of producing a derivative of an alkali metal chlorophyllin salt which comprises the steps of forming a water solution of said chlorophyllin salt, reacting said solution with sodium bisulphite and removing the solid material resulting from said reaction from said solution.

3. The method of producing a derivative of an alkali metal chlorophyllin salt which comprises the steps of forming a water solution of an alkaline metal magnesium chlorophyllin, reacting said solution with sodium bisulphite, removing the solid material resulting from said reaction from said solution and acidifying said solution.

4. The method of producing a derivative of an alkali metal chlorophyllin salt which comprises the steps of forming a water solution of potassium copper chlorophyllin, reacting said solution with sodium bisulphite and removing the solid material resulting from said reaction from said solution.

5. The method of producing a derivative of an alkali metal chlorophyllin salt which comprises the steps of forming a water solution of sodium copper chlorophyllin reacting said solution with sodium bisulphite and removing the solid material resulting from said reaction from said solution.

6. The method of producing a derivative of an alkali metal chlorophyllin salt which comprises the steps of forming a water solution of potassium magnesium chlorophyllin, reacting said solution with sodium bisulphite, removing the solid material resulting from said reaction from said solution and acidifying said solution.

7. The method of producing a derivative of an alkali metal chlorophyllin salt which comprises the steps of forming a water solution of sodium magnesium chlorophyllin, reacting said solution with sodium bisulphite, removing the solid material resulting from said reaction from said solution and acidifying said solution.

8. A chlorophyllin derivative comprising the reaction product of a water solution of an alkali metal magnesium chlorophyllin with sodium bisulphite.

9. A chlorophyllin derivative comprising the reaction product of a water solution of an alkali metal chlorophyllin salt and sodium bisulphite.

10. A chlorophyllin derivative comprising the reaction product of a water solution of potassium copper chlorophyllin with sodium bisulphite.

11. A chlorophyllin derivative comprising the reaction product of a water solution of sodium copper chlorophyllin with sodium bisulphite.

12. A pink colored chlorophyllin derivative comprising the reaction product of a water solution of a chlorophyllin salt with sodium bisulphite acidified to a pH of approximately 2.

13. The method of producing a derivative of a chlorophyllin salt which comprises reacting said salt with sodium bisulphite.

14. The method of producing a pink colored chlorophyllin derivative which comprises reacting an aqueous solution of said derivative with sodium bisulphite and separating out the pink colored product of said reaction.

15. The method of producing a chlorophyllin derivative which comprises reacting a solution of a chlorophyllin salt with sodium bisulphite and acidifying said solution.

16. A chlorophyllin derivative comprising the reaction product of a chlorophyllin salt with sodium bisulphite.

References Cited in the file of this patent

UNITED STATES PATENTS 2,434,649  Gruskin _____ Jan. 20, 1948

FOREIGN PATENTS 444,276  Great Britain _____ Mar. 18, 1936